(12) United States Patent
Barton

(10) Patent No.: US 9,699,510 B2
(45) Date of Patent: *Jul. 4, 2017

(54) SERVER-BASED PROGRAM RECORDING SCHEDULING

(71) Applicant: TiVo Solutions Inc., San Carlos, CA (US)

(72) Inventor: James M. Barton, Los Gatos, CA (US)

(73) Assignee: Tivo Solutions, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/930,557

(22) Filed: Nov. 2, 2015

(65) Prior Publication Data
US 2016/0073164 A1 Mar. 10, 2016

Related U.S. Application Data

(63) Continuation of application No. 13/915,520, filed on Jun. 11, 2013, now Pat. No. 9,179,115, which is a
(Continued)

(51) Int. Cl.
*H04N 21/458* (2011.01)
*H04N 21/442* (2011.01)
(Continued)

(52) U.S. Cl.
CPC ......... *H04N 21/4583* (2013.01); *H04N 5/765* (2013.01); *H04N 7/173* (2013.01);
(Continued)

(58) Field of Classification Search
CPC ............. H04N 21/442; H04N 21/4335; H04N 21/4583; H04N 21/262; H04N 21/26258;
(Continued)

(56) References Cited

U.S. PATENT DOCUMENTS

| 7,784,078 B2 * | 8/2010 | Ohnuma | H04N 5/782 725/87 |
| 9,179,115 B2 | 11/2015 | Barton | |

(Continued)

FOREIGN PATENT DOCUMENTS

| CN | 1579092 A | 2/2005 |
| JP | 2002-158951 | 5/2002 |

(Continued)

OTHER PUBLICATIONS

United States Patent and Trademark Office, U.S. Appl. No. 13/915,520, Non-Final Office Action dated Oct. 29, 2014.

(Continued)

*Primary Examiner* — Justin Shepard
(74) *Attorney, Agent, or Firm* — Ropes & Gray LLP

(57) ABSTRACT

A DVR sends, over the Internet, to a server, information that indicates a set of programs. The information also may indicate a ranking of the programs in the set relative to each other. In response to receiving the information from the DVR, the server determines a "to do" list of programs that the DVR should record as those programs are broadcasted in the future. The "to do" list indicates recording times and channels for each program. The server sends the "to do" list back to the DVR over the Internet. The DVR receives the "to do" list over the Internet and stores the "to do" list. As the programs on the "to do" list are broadcasted, the DVR automatically records those programs at the list-specified times and on the list-specified channels. The DVR stores those programs on the DVR's hard disk drive for later viewing by the DVR user.

15 Claims, 4 Drawing Sheets

Related U.S. Application Data continuation of application No. 12/205,761, filed on Sep. 5, 2008, now Pat. No. 8,464,309.

(51) Int. Cl.

| | | |
|---|---|---|
| *H04N 21/4335* | (2011.01) | |
| *H04N 5/765* | (2006.01) | |
| *H04N 7/173* | (2011.01) | |
| *H04N 21/262* | (2011.01) | |
| *H04N 21/41* | (2011.01) | |
| *H04N 21/4147* | (2011.01) | |
| *H04N 21/482* | (2011.01) | |
| *H04N 9/79* | (2006.01) | |
| *H04N 21/433* | (2011.01) | |
| *H04N 5/782* | (2006.01) | |
| *H04N 5/783* | (2006.01) | |
| *H04N 5/913* | (2006.01) | |
| *H04N 9/82* | (2006.01) | |
| *H04N 21/274* | (2011.01) | |

(52) U.S. Cl.
CPC ............. *H04N 9/79* (2013.01); *H04N 21/262* (2013.01); *H04N 21/26258* (2013.01); *H04N 21/4135* (2013.01); *H04N 21/4147* (2013.01); *H04N 21/4334* (2013.01); *H04N 21/4335* (2013.01); *H04N 21/442* (2013.01); *H04N 21/482* (2013.01); *H04N 21/4826* (2013.01); *H04N 5/782* (2013.01); *H04N 5/783* (2013.01); *H04N 5/913* (2013.01); *H04N 9/8205* (2013.01); *H04N 21/274* (2013.01)

(58) Field of Classification Search
CPC ........... H04N 21/4135; H04N 21/4147; H04N 21/482; H04N 21/4826; H04N 21/4334; H04N 21/274
See application file for complete search history.

(56) References Cited

U.S. PATENT DOCUMENTS

| | | |
|---|---|---|
| 2005/0005300 A1 | 1/2005 | Putterman et al. |
| 2006/0037047 A1 | 2/2006 | Deyonker et al. |
| 2006/0253874 A1 | 11/2006 | Stark et al. |
| 2006/0268099 A1 | 11/2006 | Potrebic et al. |
| 2007/0199038 A1 | 8/2007 | Choi |
| 2007/0220554 A1 | 9/2007 | Barton et al. |
| 2007/0256112 A1 | 11/2007 | Weaver |
| 2007/0300262 A1 | 12/2007 | Kim |
| 2009/0220208 A1* | 9/2009 | Gustafson ............... H04N 5/782 386/291 |
| 2013/0272682 A1 | 10/2013 | Barton |

FOREIGN PATENT DOCUMENTS

| | | |
|---|---|---|
| JP | 2006-524459 | 10/2006 |
| JP | 2008-510366 A | 4/2008 |
| JP | 2008-199339 | 8/2008 |
| JP | 2008-199436 A | 8/2008 |
| WO | WO 00/59223 | 10/2000 |
| WO | WO 2005/015906 | 2/2005 |
| WO | WO 2005/091626 | 9/2005 |

OTHER PUBLICATIONS

United States Patent and Trademark Office, U.S. Appl. No. 13/915,520, Final Office Action dated Apr. 16, 2015.
United States Patent and Trademark Office, U.S. Appl. No. 13/915,520, Notice of Allowance dated Jun. 29, 2015.
Chinese Patent Office, Application No. 200880130963.6, Foreign Office Action dated Jul. 31, 2013.
Chinese Patent Office, Application No. 200880130963.6, Foreign Office Action dated May 11, 2014.
Chinese Patent Office, Application No. 200880130963.6, Foreign Office Action dated Feb. 12, 2015.
Chinese Patent Office, Application No. 200880130963.6, Pending Claims as of Jul. 31, 2013.
Chinese Patent Office, Application No. 200880130963.6, Pending Claims as of May 11, 2014.
Chinese Patent Office, Application No. 200880130963.6, Pending Claims as of Feb. 12, 2015.
European Patent Office, Application No. 08876895.7, Extended European Search Report dated Feb. 10, 2014.
European Patent Office, Application No. 08876895.7, Pending Claims as of Feb. 10, 2014.
Japanese Patent Office, Application No. 2011-526027, Foreign Office Action dated Dec. 3, 2013.
Japanese Patent Office, Application No. 2011-526027, Foreign Office Action dated Feb. 3, 2015.
Japanese Patent Office, Application No. 2011-526027, Pending Claims as of Dec. 3, 2013.
Japanese Patent Office, Application No. 2011-526027, Pending Claims as of Feb. 3, 2015.
Chinese Patent Office, Application No. 200880130963.6, Foreign Office Action dated Feb. 5, 2016.
Chinese Patent Office, Application No. 200880130963.6, Pending Claims as of Feb. 5, 2016.
European Patent Office, Application No. 08876895.7, Foreign Office Action dated Oct. 29, 2014.
European Patent Office, Application No. 08876895.7, Foreign Office Action dated Dec. 1, 2015.
European Patent Office, Application No. 08876895.7, Pending Claims as of Oct. 29, 2014.
European Patent Office, Application No. 08876895.7, Pending Claims as of Dec. 1, 2015.
Japanese Patent Office, Application No. 2015-113530, Foreign Office Action dated Jan. 5, 2016.
Japanese Patent Office, Application No. 2015-113530, Pending Claims as of Jan. 5, 2016.

* cited by examiner

SERVER-BASED PROGRAM RECORDING SCHEDULING

CROSS-REFERENCE TO RELATED APPLICATIONS; BENEFIT CLAIM

This application claims benefit under 35 U.S.C. §120 as a Continuation of U.S. application Ser. No. 13/915,520, filed Jun. 11, 2013, which claims benefit as a Continuation of U.S. application Ser. No. 12/205,761, filed Sep. 5, 2008, now U.S. Pat. No. 8,464,309, the entire contents of which are incorporated by reference as if fully set forth herein. The applicant hereby rescinds any disclaimer of claim scope in the parent application or the prosecution history thereof and advises the USPTO that the claims in this application may be broader than any claim in the parent application.

FIELD OF THE INVENTION

Embodiments of the invention generally relate to digital video recorders (DVRs). Embodiments of the invention relate more specifically to techniques for scheduling and coordinating the recordings of upcoming televised programs using the processing power of a server that is located remotely from the DVR that will actually be recording those programs.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Sophisticated, modern DVRs are capable of scheduling the recordings of programs that are to be televised some time in the future. If a DVR user is interested in recording all episodes of a televised series, then the DVR user can instruct his DVR to get a "season pass" for that series. In response to such an instruction, the DVR automatically determines, from electronic programming guide ("EPG") data, times at which episodes of that series are going to be televised in the future. Usually, whenever an episode of the selected series is about to be broadcasted, the DVR automatically tunes to the channel on which the episode is going to be broadcasted and records that episode on the DVR's hard disk drive. For as long as the recorded episode remains on the DVR's hard disk drive, the DVR's user can instruct the DVR to replay the episode to the user's television. Conveniently, this allows the DVR user to watch programs in which the user is interested at times other than those program's broadcasting times. The DVR user does not even need to know, beforehand, the exact times at which those programs are going to be broadcasted.

As used herein, a "program" is any content, visual and/or audible, that is presented through a television's display and/or speakers. For example, a program might be an episode of a multi-episode series, a movie, a sporting event, or a news presentation, although this is not an exclusive list of "programs." When a DVR schedules a program for future recording, the DVR attempts to add the program to a "to do" list that the DVR maintains within the DVR's own storage mechanisms. Whenever a program on the DVR's "to do" list is broadcasted, the DVR automatically records that program. However, before the DVR adds a program to the DVR's "to do" list, the DVR determines whether any part of that program is going to be broadcasted at the same time that any other program, already on the "to do" list, is going to be broadcasted. If the DVR is only capable of recording one program at a time (as many DVRs are), and if any part of the "new" program that the DVR is trying to add to the DVR's "to do" list is going to be broadcasted during the same time interval in which another program already on the "to do" list is going to be broadcasted, then those two program conflict with each other. Before the DVR can add the "new" program to its "to do" list, the DVR needs to resolve the conflict between the programs.

There may be multiple ways in which a DVR can resolve a conflict between programs. For example, at the time that the DVR detects a conflict, the DVR may inform the DVR user that the conflicting programs cannot both be recorded because they will be broadcasted at time intervals that overlap at least partially. The DVR may ask the DVR user to select one or the other of the conflicting programs. The DVR places (or maintains) the selected program on the DVR's "to do" list. The DVR removes the non-selected program from (or refrains from adding the non-selected program to) the DVR's "to do" list. If there are multiple episodes of a series to which the non-selected program belongs, then the DVR may give the DVR user the option of scheduling the recording of all episodes of the series that do not conflict with programs that are already on the "to do" list.

In order to provide this option, a DVR may maintain a "priority list" that contains multiple "season passes" that the DVR user has selected. Each "season pass" represents a series whose episodes the DVR user would like the DVR to record automatically. The "season passes" in the "priority list" are maintained in ranked order. If the recording of a program from one "season pass" conflicts with the recording of a program from another "season pass," then the DVR places the program from the higher-ranked "season pass" on the DVR's "to do" list, and refrains from placing the program from the lower-ranked "season pass" on the DVR's "to do" list.

A DVR user may instruct the DVR to change the rankings of "season passes" that are in the DVR's "priority list." Such a change can occur in response to the DVR user's addition of a new "season pass" to the "priority list," for example. When "season passes" are re-ranked, for whatever reason, the DVR responsively re-determines which programs ought to be on the "to do" list. The re-ranking of "season passes" in the "priority list" will often cause the DVR to remove some programs from the "to do" list and add other programs to the "to do" list. This can be a computationally intensive task. If a DVR does not have significant processing resources, then this task can occupy the DVR for a significant period of time—during which the DVR might not be able to perform certain other tasks. However, if the DVR is constructed with significant processing resources, then the monetary expense of the DVR may increase significantly, making the DVR less attractive to potential DVR purchasers. Additionally, if the DVR is part of a set-top box that performs many functions, then the set-top box might only allow the DVR part to utilize a small fraction of the set-top box's processing resources.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
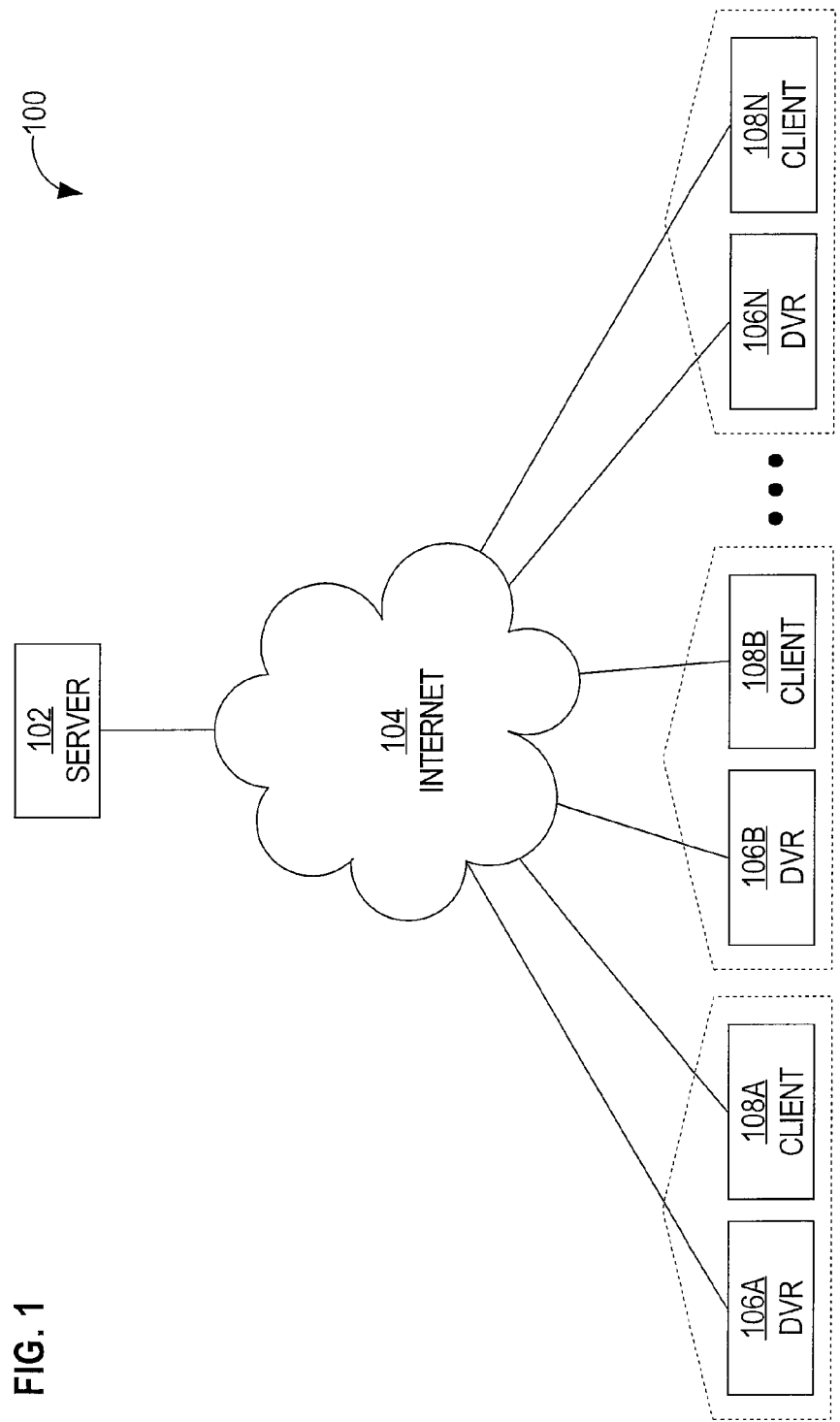
FIG. 1 is a block diagram that illustrates an example of a system in which an embodiment of the invention may be implemented.

A method and apparatus for scheduling the recording of upcoming programs is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 DVR Overview
3.0 Scheduling Recordings of Programs at a Server on Behalf of a DVR
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method whereby a server that is located remotely from a DVR schedules the recording of upcoming programs on behalf of the DVR, so that the DVR is spared the computational burden of scheduling those recordings.

According to one embodiment of the invention, a DVR sends, over the Internet, to a server that is located remotely from the DVR, information that indicates a single program, a set of programs, and/or multi-episode series that the DVR user has instructed the DVR to record in the future. The information also may indicate a ranking of the programs and/or series in the set relative to each other; such a ranking may be previously specified by the DVR user and stored on the DVR's hard disk drive. In response to receiving the information from the DVR, the server determines a "to do" list of programs that the DVR should record as those programs are broadcasted in the future. The "to do" list indicates, among potentially other information, (a) the channels to which the DVR should tune and (b) the dates and times at which the DVR should tune to those channels in order to record the programs in the "to do" list. After determining the "to do" list for the DVR, the server sends the "to do" list back to the DVR over the Internet. The DVR receives the "to do" list over the Internet from the server and stores the "to do" list on the DVR's hard disk drive. As the programs on the "to do" list are broadcasted, the DVR automatically records those programs at the list-specified dates and times and on the list-specified channels. The DVR stores those programs on the DVR's hard disk drive for later viewing by the DVR user.

In one embodiment of the invention, in determining the "to do" list for the DVR, the server determines whether two or more programs that the DVR user wanted to record are going to be broadcasted during time intervals that at least partially overlap—in other words, the server determines whether two or more such programs' broadcasts conflict. In one embodiment of the invention, in response to determining that two or more such programs' broadcasts conflict, the server attempts, using EPG data, to find a set of future broadcasts of all (or as many as possible) of those programs that do not conflict. For example, if broadcasts of two programs conflict, then the server may attempt to find a later broadcast of one of the programs that can be recorded in lieu of that program's broadcast that conflicts with the broadcast of the other program (often, a program will be broadcasted at multiple different dates and/or times, potentially on different channels). In such an embodiment of the invention, if the server can find such a set, then the server adds, to the "to do" list for the DVR, the non-conflicting broadcasts of the programs in the set. Alternatively, in such an embodiment of the invention, if the server cannot find a complete set of non-conflicting broadcasts of programs that the DVR user wants the DVR to record, then, for each group of program broadcasts that irreconcilably conflict with each other, the server selects, from that group, a broadcast of a program that is ranked the highest of the programs in the group, according to the ranking information obtained from the DVR. The server adds this broadcast to the "to do" list and ignores the other broadcasts in the group. Alternatively, the server may instruct the DVR to ask the DVR's user to choose between the conflicting programs.

In one embodiment of the invention, the server constructs the "to do" list in a manner such that programs that the DVR has already recorded and stored on the DVR's hard disk drive can remain on the DVR's hard disk drive for the maximum possible amount of time, or until "expiration dates" associated with the recordings of those programs are passed. For example, in order to delay the time at which the DVR's hard drive will become so full that at least one recorded program needs to be deleted in order to make room for a new recording of a particular program, the server may attempt to find and add, to the "to do" list, a future broadcast of the particular program that is not necessarily the next-occurring broadcast, but which will be broadcasted after the passage of an "expiration date" of an already recorded program (which can then be deleted from the hard drive to make room for the recording of the particular program). By selecting a later broadcast of the particular program, the server can attempt to maximize the amounts of time that recordings of programs remain available for viewing on the DVR's hard disk drive—so that fewer recorded programs are deleted from the hard drive before those programs' "expiration dates" have passed.

In one embodiment of the invention, a server as discussed above receives information from multiple separate DVRs, which may be located remotely from both the server and from each other, over the Internet. The DVRs from which the server receives such information may be owned by different people and reside in different houses. For each such DVR, the information that the server receives from that DVR indicates a set of programs and/or multi-episode series that the DVR's user has instructed the DVR to record in the future. The information also may indicate a ranking of the programs and/or series in the set relative to each other. For each DVR from which the server receives such information, the server may determine a "to do" list for that DVR; the server may determine different "to do" lists for different DVRs. The server sends each DVR a "to do" list that the server has determined for that DVR (e.g., in the manner discussed above). Those DVRs use the received "to do" lists to tune to the appropriate channels at the appropriate times in order to record, automatically, programs whose recordings are desired by the users of those DVRs. Thus, in one embodiment of the invention, the computing power of a single server may be utilized in a shared fashion (e.g., by taking turns) by multiple separate DVRs.

As a result of the foregoing techniques, in one embodiment of the invention, DVRs can be constructed with fewer processing resources. This cheaper construction makes possible a reduction in cost and price of the DVRs, making the DVRs more attractive to potential purchasers of those DVRs. In contrast, the server discussed above may be implemented as a more powerful computer with processing resources that allow the server to perform scheduling tasks rapidly on behalf of the DVRs.

In other aspects, embodiments of the invention encompass a computer apparatus and a computer-readable storage medium configured to carry out the foregoing technique. For example, in one embodiment of the invention, a computer-readable medium stores code that instructs a server, as described above, to perform the server's operations described above. For another example, in one embodiment of the invention, a computer-readable medium stores code that instructs a DVR to interact with a server in the manner described above.

2.0 DVR Overview

Figure 3:
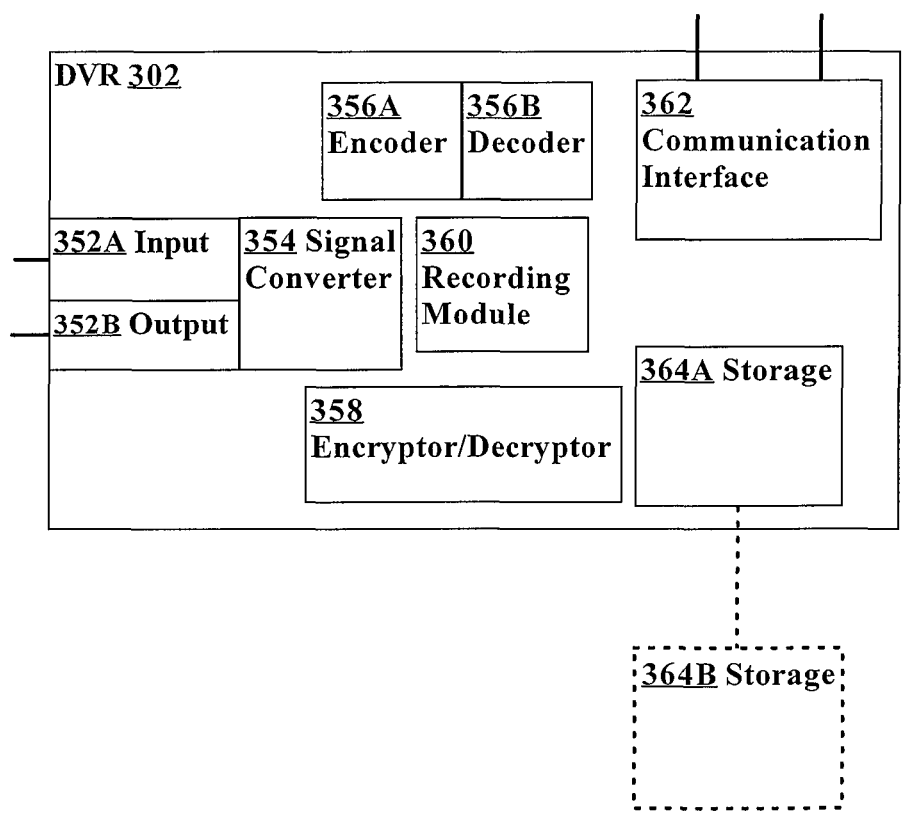
FIG. 3 is a block diagram that shows an example of the internal structure and operation of a DVR, according to an embodiment of the invention.

FIG. 3 is a block diagram that shows an example of the internal structure and operation of a DVR, according to an embodiment of the invention. In an embodiment, DVR 302 generally comprises a plurality of components, signified by Signal Converter 354, that are necessary to digitize an analog television signal and convert it into a digital data stream or accept a digital data stream. An example of the internal structure and operation of a DVR is further described in U.S. Pat. No. 6,233,389.

DVR 302 receives broadcast signals from an antenna, from a cable TV system, satellite receiver, etc., via input 352A. Input 352A may comprise a plurality of tuning modules that allow a plurality of signals to be received and recorded simultaneously. For example, a TV input stream received by input 352A may take the form of a National Television Standards Committee (NTSC) compliant signal or a PAL compliant broadcast signal. For another example, a TV input stream received by input 352A may take a digital form such as a Digital Satellite System (DSS) compliant signal, a Digital Broadcast Services (DBS) compliant signal, or an Advanced Television Standards Committee (ATSC) compliant signal. DBS, DSS, and ATSC are based on standards called Moving Pictures Experts Group 2 (MPEG-2) and MPEG-2 Transport. MPEG-2 Transport is a standard for formatting the digital data stream from the TV source transmitter so that a TV receiver can disassemble the input stream to find programs in the multiplexed signal.

An MPEG-2 transport multiplex supports multiple programs in the same broadcast channel with multiple video and audio feeds and private data. Input 352A tunes to a particular program in a channel, extracts a specified MPEG stream from the channel, and feeds the MPEG stream to the rest of the system. Analog TV signals are encoded into a similar MPEG format using separate video and audio encoders, such that the remainder of the system is unaware of how the signal was obtained. Information may be modulated into the vertical blanking interval (VBI) of the analog TV signal in a number of standard ways; for example, the North American Broadcast Teletext Standard (NABTS) may be used to modulate information onto certain lines of an NTSC signal, which the FCC mandates the use of a certain other line for closed caption (CC) and extended data services (EDS). Such signals are decoded by input 352A and passed to the other modules as if the signals had been delivered via an MPEG-2 private data channel.

Recording Module 360 records the incoming data stream by storing the digital data stream on at least one storage facility, signified by Storage 364A/164B that is designed to retain segments of the digital data stream. Storage 364A/164B may be one or more non-volatile storage devices (e.g., hard disk, solid state drive, USB external hard drive, USB external memory stick, USB external solid state drive, network accessible storage device, etc.) that are internal 364A and/or external 364B. A Signal Converter 354 retrieves segments of the data stream, convert the data stream into an analog signal, and then modulate the signal onto a RF carrier, via Output 352B, through which the signal is delivered to a standard TV set. Output 352B may alternatively deliver a digital signal to a TV set or video monitor. For example, DVR 302 may utilize a Digital Visual Interface port (DVI) for sending digital signals to a TV via a DVI cable.

DVR 302 also includes a Communication Interface 362, through which the DVR 302 communicates with Network 305 via Ethernet, wireless network, modem, or other communications standard. Further, DVR 302 may be integrated into a TV system such that the components described above are housed in a TV set capable of performing the functions of each component of DVR 302.

In another embodiment, DVR 302 generally comprises a plurality of components necessary to receive, record, store, transfer and playback digital data signals from a plurality of sources, such as a PC, a DVR, a service provider, or content server. DVR 302 can transfer digital data signals to another DVR or PC. DVR 302 may encode or decode digital signals via Encoder 356A and Decoder 356B into a plurality of formats for playback, storage or transfer. According to one embodiment of the invention, encoder 356A produces MPEG streams. According to another embodiment of the invention, encoder 356A produces streams that are encoded using a different codec. Decoder 356B decodes the streams encoded by encoder 356A or streams that are stored in the format in which the streams were received using an appropriate decoder. DVR 302 can also encrypt or decrypt digital data signals using Encryptor/Decryptor 358 for storage, transfer or playback of the digital data signals.

In one embodiment, DVR 302 communicates with a service provider, which provides program guide data, graphical resources such as brand icons and pictures, service information, software programs, advertisements, and other forms of data that enable DVR 302 to operate independently of the service provider to perform autonomous recording functions. Communication between DVR 302 and the service provider utilizes a secure distribution architecture to transfer data between the DVR 302 and the service provider such that both the service data and the user's privacy are protected.

3.0 Scheduling Recordings of Programs at a Server on Behalf of a DVR

FIG. 1 is a block diagram that illustrates an example of a system 100 in which an embodiment of the invention may be implemented. System 100 includes server 102, Internet 104, DVRs 106A-N and clients 108A-N. DVRs 106A-N may reside in different buildings from each other. Clients 108A-N may reside in different buildings from each other. Additionally or alternatively, one or more of clients 108A-N may be mobile. DVRs 106A-N and clients 108A-N reside in buildings other than the building in which server 102 resides. DVRs 106A-N and clients 108A-N communicate with server 102 via Internet 104 and/or some other combination of networks (e.g., local area networks, wide area networks, wireless networks, telephone lines, etc.). In one embodiment of the invention, DVRs 106A-N and clients 108A-N communicate with each other by sending messages over Internet 104 according to Internet Protocol (IP) and Transmission Control Protocol (TCP). Such messages may be formatted in Extensible Markup Language (XML), for example. Such messages may be transmitted in the form of instant messages, for example. In one embodiment of the invention, DVRs 106A-N communicate with each other, and with server 102, in a secure manner, such that external unauthorized parties cannot interpret communications between DVRs 106A-N and/or server 102. Techniques whereby DVRs can communicate with each other and with servers in a secure manner are disclosed in U.S. patent application Ser. No. 10/220,356 and in U.S. patent application Ser. No. 10/220,558, both of which patent applications are incorporated by reference for all purposes as though fully disclosed herein.

Clients 108A-N may be different kinds of devices. For example, various ones of clients 108A-N may be personal computers, laptop computers, cellular telephones, personal digital assistants, and/or other devices. Web browser applications, such as Mozilla Firefox, for example, may execute on one or more of clients 108A-N. Such web browser applications may request and receive web pages from server 102 over Internet 104. In one embodiment of the invention, server 102 serves, to clients 108A-N, web pages that contain forms with fields into which users of clients 108A-N can enter information to be submitted to server 102. Such information may identify programs and/or multi-episode series that users of clients 108A-N want corresponding ones of DVRs 106A-N to record. Each of DVRs 106A-N may be associated with a different identifier. Clients 108A-N may identify the DVRs to which those clients' communications pertain via the identifiers that are associated with those DVRs.

In one embodiment of the invention, each of DVRs 106A-N has a hard disk drive on which that DVR maintains a list of programs and/or multi-episode series that users of that DVR want that DVR to record automatically. Using a remote control, a user of any of DVRs 106A-N can select, from DVR-presented menus, programs and/or multi-episode series that the user wants to have recorded. In response to such a user's selection, the DVR through which the selection was made adds the selected program and/or multi-episode series to that DVR's list of desired recordings. In one embodiment of the invention, each of DVRs 106A-N maintains a separate list of desired recordings on that DVR's hard disk drive. However, in an alternative embodiment of the invention, DVRs 106A-N do not each maintain a list of programs on their own hard disk drives. Instead, in such an alternative embodiment of the invention, only server 102 maintains a list of desired programs for each of DVRs 106A-N. Server 102 may maintain this information in a database, for example. In such an alternative embodiment of the invention, in response to a user of any of DVRs 106A-N selecting a program to be scheduled for recording, that DVR sends, to server 102, only an identity of the selected program. In response to receiving the identity of the selected program, server 102 fetches a list of programs associated with the DVR from which the program identity was received, tentatively adds the identified program to the list, and computes a "to do" list for that DVR (as is discussed in greater detail below). If no conflicts are detected between the tentatively scheduled recording of the identified program and other scheduled recordings indicated in the DVR's "to do" list, then server 102 permanently adds the scheduled recording of the identified program to the DVR's "to do" list, and sends the updated "to do" list to the DVR. Alternatively, in such an alternative embodiment of the invention, if a conflict does exist, then server 102 instructs the DVR to ask the user to choose between the conflicting scheduled recordings. After the user chooses, the DVR sends the user's choice to server 102, which updates the DVR's "to do" list accordingly, and sends the revised "to do" list back to the DVR. In such an alternative embodiment of the invention, there is no desired list of programs stored on any of DVRs 106A-N. Techniques for scheduling recordings are disclosed in U.S. patent application Ser. No. 09/422,121, which patent application is incorporated by reference for all purposes as though fully disclosed herein.

In one embodiment of the invention, for each of DVRs 106A-N, server 102 maintains a separate list of desired recordings on that server's hard disk drive. In one embodiment of the invention, clients 108A-N can interact with server 102 via Internet 104 to make changes to the desired recording lists stored on server 102. Periodically (e.g., every 15 minutes), and/or in response to specified events (e.g., the addition of a new program to a DVR's desired recording list or the removal of a program from a DVR's desired recording list), server 102 synchronizes with DVRs 106A-N (server 102 may synchronize with different ones of DVRs 106A-N at different times). In one embodiment of the invention, during synchronization with a particular DVR, server 102 (a) receives, over Internet 104, the desired recording list that is stored on the particular DVR, (b) merges that list with the corresponding desired recording list (for the particular DVR) that is stored on server 102, (c) stores the merged desired recording list on server 102, and (d) sends the merged desired recording list back to the particular DVR via Internet 104. In response to receiving the merged desired recording list, the particular DVR stores the merged desired recording list on that DVR's hard disk drive. As a result of the synchronization, the desired recording lists stored at server 102 and the particular DVR are made the same. In one embodiment of the invention, whenever a change is made to a desired recording list at either server 102 or one of DVRs 106A-N, the entity at which the change was made sends an instant message to the entity at which the change was not made (e.g., server 102 or the appropriate one of DVRs 106A-N), indicating the change that was made. The entity receiving such an instant message may automatically make the change to its locally stored version of the desired recording list. However, as is discussed above, in an alternative embodiment of the invention, a desired list of programs for each of DVRs 106A-N is stored only at server 102, and not at DVRs 106A-N. In such an alternative embodiment of the invention, no DVR-server synchronization of desired program lists, such as is described above, is performed.

In one embodiment of the invention, each desired recording list is ordered according to user priority specifications and rankings. Through DVRs 106A-N and/or clients 108A-N, users can change the rankings of programs and series on the desired recording lists, so that one program and/or series has a higher or lower recording priority than other programs and/or series on a desired recording list.

Periodically, and/or in response to specified events (e.g., a change to a DVR's desired recording list), server 102 generates separate "to do" lists for each of DVRs 106A-N. Server 102 generates a "to do" list for a particular DVR based on EPG data and the desired recording list for the particular DVR. In one embodiment of the invention, prior to generating a "to do" list for a particular DVR, server 102 synchronizes with that particular DVR, in the manner described above, to ensure that the version of the particular DVR's desired recording list that is stored on server 102 is the same as the version that is stored on the particular DVR. However, in an alternative embodiment of the invention described above, only server 102 stores the particular DVR's desired recording list, and no such synchronization takes place. Server 102 generates a "to do" list for a particular DVR in the manner that is discussed above. In one embodiment of the invention, server 102 attempts to add, to the particular DVR's "to do" list, broadcasts for all of the programs and all of the known (from the EPG data) episodes of the series in the particular DVR's desired recording list. In cases where the particular DVR's desired recording list indicates a multi-episode series, server 102 searches EPG data for all episodes that belong to that series, and treats each of those episodes as a separate program in the desired recording list for purposes of generating the "to do" list.

In one embodiment of the invention, server 102 attempts to schedule the program broadcasts in the particular DVR's "to do" list in a way such that other program broadcasts that are already recorded and stored on the particular DVR's hard disk drive will remain on the particular DVR's hard disk drive, and will not be deleted or overwritten, for the longest possible amount of time prior to those recorded broadcasts' expiration times. In generating the "to do" list for the particular DVR, server 102 uses the priority rankings in the particular DVR's desired recording list to resolve conflicts between program broadcasts that occur during time intervals that overlap at least partially.

As is discussed above, in one embodiment of the invention, the "to do" list indicates, for each scheduled program broadcast on the "to list," dates and times at which to begin and end recording of the scheduled program broadcast, and the channel on which the scheduled program will be broadcasted. Server 102 may glean such starting and ending dates and times for future program broadcasts from EPG data that server 102 periodically and automatically obtains from an EPG data provider.

After server 102 has generated a "to do" list for a particular DVR of DVRs 106A-N, server 102 stores the "to do" list on a local hard disk drive and also sends the "to do" list to the particular DVR over Internet 104. In one embodiment of the invention, server 102 maintains persistent connections (e.g., persistent TCP connections) with each of DVRs 106A-N at all times, and communicates with DVRs 106A-N via these persistent connections. In one embodiment of the invention, these persistent connections are "instant messaging" connections of the same kind that are used by "instant messaging" applications (e.g., Yahoo Instant Messenger), and information is communicated between server 102 and DVRs 106A-N via instant messages. In response to receiving a "to do" list from server 102, a particular DVR of DVRs 106A-N stores the "to do" list on the particular DVR's hard disk drive. Thereafter, whenever the date and time for a scheduled program broadcast on the "to do" list is about to become the current date and time, the particular DVR tunes to the channel indicated in the "to do" list for that scheduled program broadcast and begins recording the program broadcast, storing the program on the particular DVR's hard disk drive. The particular DVR records from the indicated channel until the ending date and time indicated for the scheduled program broadcast has been reached. Although an embodiment of the invention discussed above schedules the recordings of televised content, alternative embodiments of the invention may similarly involve the scheduling of content that is accessible and viewable via the Internet (such content might or might not also be televised in the traditional manner). For example, in one embodiment of the invention, server 102 generates a "to do" list of content that is downloadable and/or streamable through Amazon Un-Box and/or from YouTube. In such an embodiment of the invention, server 102 sends this list to a DVR. A "to do" list may include combinations of televised and Internet-downloadable/streamable content.

Thus, in one embodiment of the invention, DVRs 106A-N do not ever generate "to do" lists. In such an embodiment of the invention, "to do" lists for DVRs 106A-N are generated exclusively by server 102 in the manner described above. Because DVRs 106A-N do not need to generate "to do" lists in such an embodiment of the invention, DVRs 106A-N may be constructed with less powerful and less expensive processing resources. Set-top boxes into which DVRs 106A-N might be incorporated can devote fewer processing resources and less processing time to DVR-specific tasks.

In one embodiment of the invention, one or more of DVRs 106A-N also act in the same capacity as one of clients 108A-N. For example, if a list of desired programs is stored on server 102, then a user of DVR 106A might transparently modify the list in the same manner that any web browser client application would. In such a case, the user of DVR 106A would ask to view the list. In response, DVR 106A would retrieve a copy of the list from server 102 and present the list to the user. The user would then modify the list via user interfaces presented by DVR 106A. After the user had finished modifying the list, DVR 106A would send the list back to server 102. Server 102 would responsively generate the "to do" list based on the modified list received from DVR 106A, after which server 102 would send the "to do" list back to DVR 106A.

Figure 2:
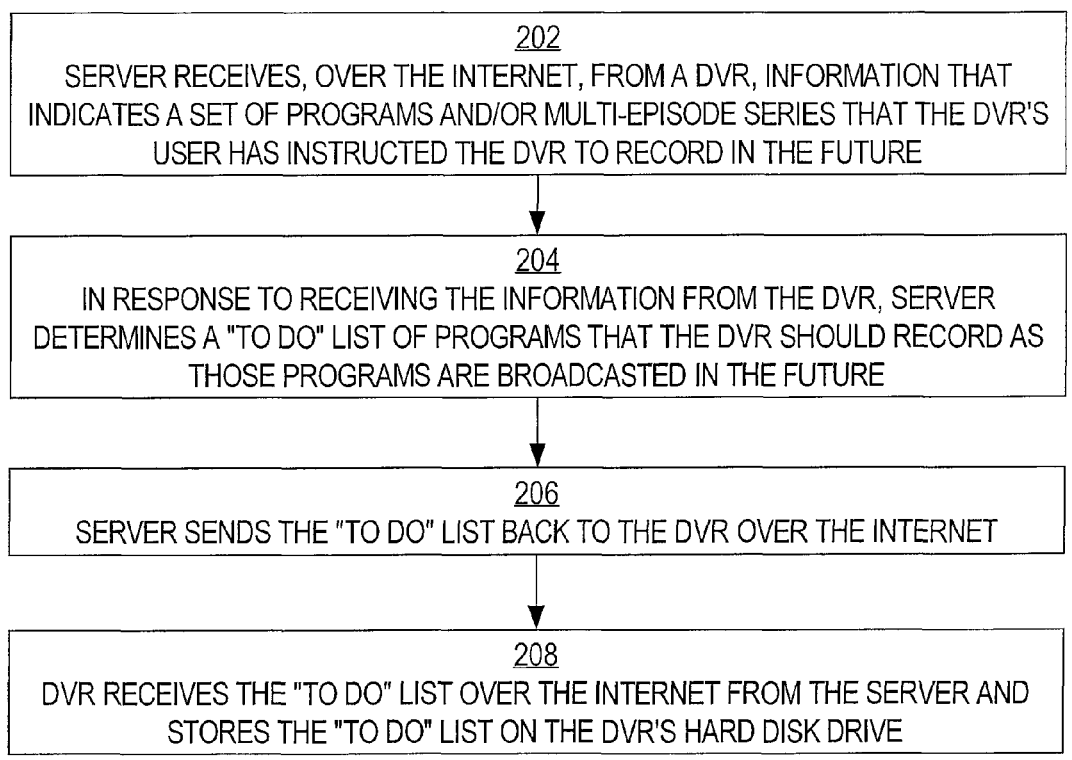
FIG. 2 is a flow diagram that illustrates an example of a technique for generating a "to do" list of scheduled program recordings at a server on behalf of a DVR, according to an embodiment of the invention.

FIG. 2 is a flow diagram that illustrates an example of a technique for generating a "to do" list of scheduled program recordings at a server on behalf of a DVR, according to an embodiment of the invention. In one embodiment of the invention, at least some of the steps of the illustrated technique are performed by server 102. In block 202, a server receives, over the Internet, from a DVR, information that indicates a set of programs and/or multi-episode series that the DVR's user has instructed the DVR to record in the future. In one embodiment of the invention, this information might indicate nothing more than the identity of a single program that the DVR's user has just instructed the DVR to record. In block 204, in response to receiving the information from the DVR, the server determines a "to do" list of programs that the DVR should record as those programs are broadcasted in the future. The "to do" list indicates, among potentially other information, (a) the channels to which the DVR should tune and (b) the dates and times at which the DVR should tune to those channels in order to record the programs in the "to do" list. In block 206, after determining the "to do" list for the DVR, the server sends the "to do" list back to the DVR over the Internet. In block 208, the DVR receives the "to do" list over the Internet from the server and stores the "to do" list on the DVR's hard disk drive. As the programs on the "to do" list are broadcasted, the DVR automatically records those programs at the list-specified dates and times and on the list-specified channels. The DVR stores those programs on the DVR's hard disk drive for later viewing by the DVR user.

4.0 Implementation Mechanisms—Hardware Overview

Figure 4:
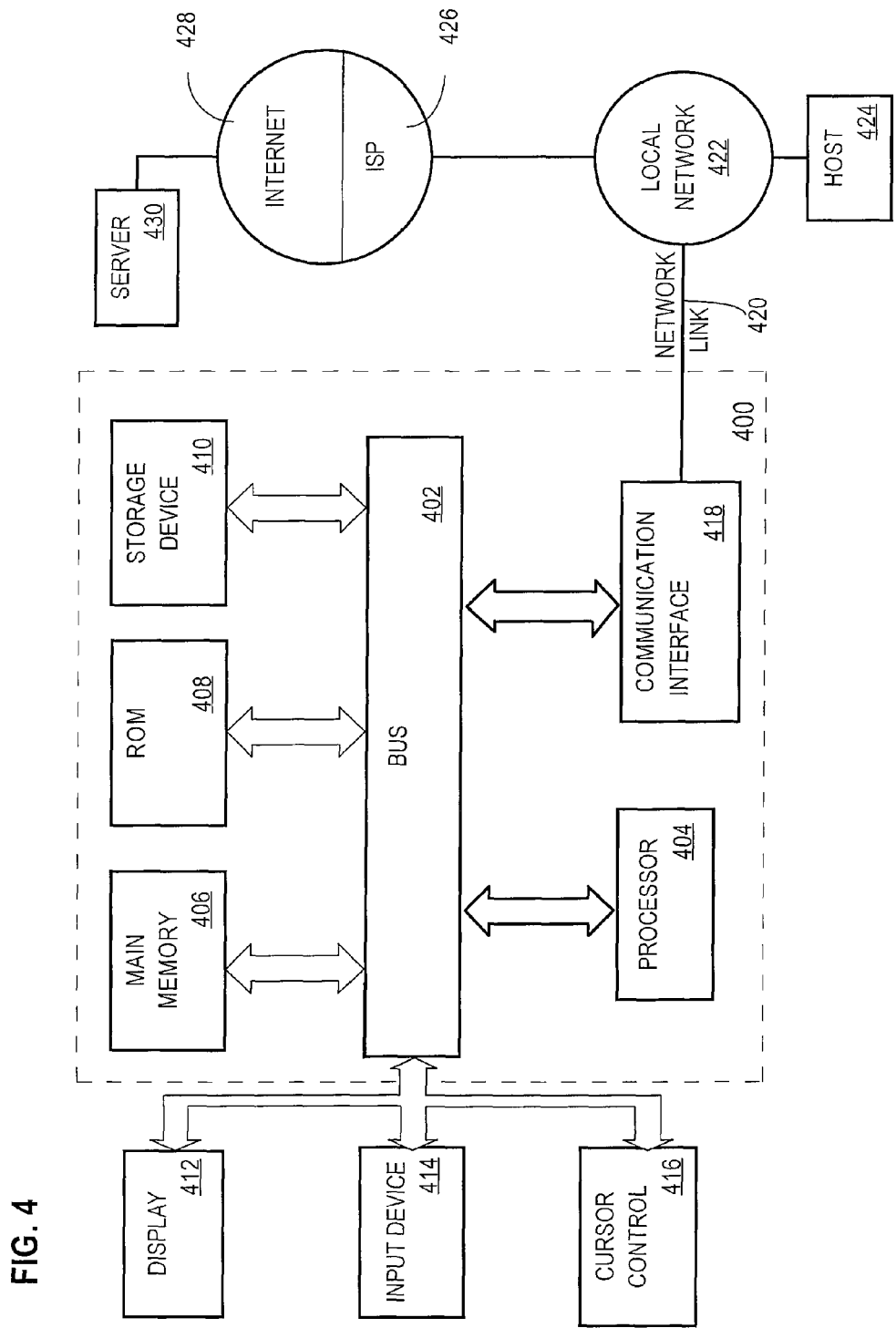
FIG. 4 is a block diagram that illustrates a digital video recorder upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for selecting a frame of a multi-frame video program for display in accordance with a selected trick play mode of a DVR. According to one embodiment of the invention, selecting a frame of a multi-frame video program for display in accordance with a selected trick play mode of a DVR is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, or any other memory chip or cartridge.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising:
   receiving, by a media recorder from a server over a network, a first program recording schedule that the server generated that is an overall program recording schedule for the media recorder and is maintained by the server;
   replacing, by the media recorder, an existing program recording schedule with the first program recording schedule;
   receiving, by the media recorder, user input specifying a program to be recorded by the media recorder;
   sending, by the media recorder, an instant message to the server indicating an identifier of the program to be recorded;
   receiving, by the media recorder from the server over the network, a second program recording schedule that the server generated in response to receiving the identifier of the program to be recorded, the second program recording schedule is an overall program recording schedule for the media recorder;
   replacing, by the media recorder, the first program recording schedule with the second program recording schedule.

2. The method of claim 1, wherein the first program recording schedule and the second program recording schedule indicate channels, dates, and times for programs that are to be recorded by the media recorder.

3. The method of claim 1, wherein the first program recording schedule and the second program recording schedule indicate Internet streaming content to be recorded by the media recorder.

4. The method of claim 1, wherein the first program recording schedule and the second program recording schedule indicate Internet downloadable content to be recorded by the media recorder.

5. The method of claim 1, wherein the server creates and stores recording schedules for a plurality of media recorders thereby offloading processing demands from the plurality of media recorders, the media recorder among the plurality of media recorders.

6. A media recorder, comprising:
   a communication interface that receives from a server over a network a first program recording schedule that the server generated that is an overall program recording schedule for the media recorder and is maintained by the server;
   a recording device that replaces an existing program recording schedule with the first program recording schedule;
   wherein the communication interface receives user input specifying a program to be recorded by the media recorder;
   wherein the communication interface sends an instant message to the server indicating an identifier of the program to be recorded;
   wherein the communication interface receives from the server over the network, a second program recording schedule that the server generated in response to receiving the identifier of the program to be recorded, the second program recording schedule is an overall program recording schedule for the media recorder; and
   wherein the recording device replaces the first program recording schedule with the second program recording schedule.

7. The method of claim 6, wherein the first program recording schedule and the second program recording schedule indicate channels, dates, and times for programs that are to be recorded by the media recorder.

8. The method of claim 6, wherein the first program recording schedule and the second program recording schedule indicate Internet streaming content to be recorded by the media recorder.

9. The method of claim 6, wherein the first program recording schedule and the second program recording schedule indicate Internet downloadable content to be recorded by the media recorder.

10. The method of claim 6, wherein the server creates and stores recording schedules for a plurality of media recorders thereby offloading processing demands from the plurality of media recorders, the media recorder among the plurality of media recorders.

11. A non-transitory computer-readable medium storing instructions, wherein the instructions, when executed by one or more processors, cause the one or more processors to perform steps comprising:
    receiving, by a media recorder from a server over a network, a first program recording schedule that the server generated that is an overall program recording schedule for the media recorder and is maintained by the server;
    replacing, by the media recorder, an existing program recording schedule with the first program recording schedule;
    receiving, by the media recorder, user input specifying a program to be recorded by the media recorder;
    sending, by the media recorder, an instant message to the server indicating an identifier of the program to be recorded;
    receiving, by the media recorder from the server over the network, a second program recording schedule that the server generated in response to receiving the identifier of the program to be recorded, the second program recording schedule is an overall program recording schedule for the media recorder;
    replacing, by the media recorder, the first program recording schedule with the second program recording schedule.

12. The non-transitory computer-readable medium of claim 11, wherein the first program recording schedule and the second program recording schedule indicate channels, dates, and times for programs that are to be recorded by the media recorder.

13. The non-transitory computer-readable medium of claim 11, wherein the first program recording schedule and the second program recording schedule indicate Internet streaming content to be recorded by the media recorder.

14. The non-transitory computer-readable medium of claim 11, wherein the first program recording schedule and the second program recording schedule indicate Internet downloadable content to be recorded by the media recorder.

15. The non-transitory computer-readable medium of claim 11, wherein the server creates and stores recording schedules for a plurality of media recorders thereby offloading processing demands from the plurality of media recorders, the media recorder among the plurality of media recorders.

* * * * *